United States Patent [19]

Takayama

[11] Patent Number: 4,839,908
[45] Date of Patent: Jun. 13, 1989

[54] TRANSMISSION CONTROL APPARATUS

[75] Inventor: Haruyoshi Takayama, Yokosuka, Japan

[73] Assignee: Canon Kabushiki Kaisha, Tokyo, Japan

[21] Appl. No.: 9,464

[22] Filed: Jan. 28, 1987

[30] Foreign Application Priority Data

Feb. 3, 1986 [JP] Japan ................................ 61-21636
Feb. 3, 1986 [JP] Japan ................................ 61-21637
Feb. 3, 1986 [JP] Japan ................................ 61-21638
Feb. 3, 1986 [JP] Japan ................................ 61-21639
Feb. 3, 1986 [JP] Japan ................................ 61-21640
Feb. 3, 1986 [JP] Japan ................................ 61-21641

[51] Int. Cl.$^4$ ............................................. H04B 1/10
[52] U.S. Cl. ..................................... 375/104; 371/12; 371/62; 455/58
[58] Field of Search ................... 375/7, 103, 104, 100; 370/100, 105; 371/62, 69, 12; 307/527; 328/63, 72; 455/58; 340/825.5

[56] References Cited

U.S. PATENT DOCUMENTS

| 3,191,153 | 6/1965 | Bratschi et al. | 371/62 |
| 3,566,280 | 2/1971 | Emmons et al. | 375/113 |
| 3,938,082 | 2/1976 | Schowe, Jr. | 371/62 |
| 4,063,180 | 12/1977 | Norman | 375/104 |
| 4,128,809 | 12/1978 | Kage | 375/100 |
| 4,276,642 | 6/1981 | Siglow et al. | 370/105 |
| 4,410,991 | 10/1983 | Lenart | 371/12 |
| 4,488,303 | 12/1984 | Abramovich | 371/12 |
| 4,538,273 | 8/1985 | Lasser | 371/12 |
| 4,627,060 | 12/1986 | Huang et al. | 371/62 |
| 4,696,002 | 9/1987 | Schleupen et al. | 371/12 |

Primary Examiner—Robert L. Griffin
Assistant Examiner—Stephen Chin
Attorney, Agent, or Firm—Fitzpatrick, Cella, Harper & Scinto

[57] ABSTRACT

A data transmission control apparatus is provided in which received data are considered invalid for a predetermined period after the start of data reception is detected, in order to avoid errors in transmission which are more frequent at the initial period of the transmission.

17 Claims, 5 Drawing Sheets

TRANSMISSION CONTROL APPARATUS

BACKGROUND OF THE INVENTION

1. Field of the Invention

The present invention relates to a transmission control apparatus for controlling data transmission in a data transmission system for sending or receiving data through signal transmission channels.

2. Related Background Art

There are already proposed various data transmission systems for transmitting image data or computer generated data among plural stations through signal transmission channels.

The signal receiving station in such data transmission system identifies the reception of a signal even for a single pulse, for example, due to noise on the signal transmission channel, and it is identified as an error signal only after predetermined signal processing. In this manner the identification of an error signal requires a considerably long time.

Also a modulation process involving a time factor and a data factor such as Manchester encoding is often applied to the transmitted data, but distortion in the received signal will result in errors in the resulting time signal and data signal, eventually leading to incorrect data.

Also in a transmission control apparatus, a sending or transmitting circuit and a receiving circuit are respectively connected to signal transmission lines exclusively assigned for transmission and reception, so that the receiving circuit is not affected by the signal from the sending circuit.

However in a system utilizing a signal transmission channel common to signal sending and receiving, such as a signal bus, the sending circuit and the receiving circuit are connected to a common signal transmission channel, so that the signal emitted by the sending circuit is received also by the receiving circuit of the same station. Consequently the transmission control circuit has to control not only the sending circuit but also the receiving circuit against the signal emitted by itself, thus resulting in a loss in control efficiency.

Also the use of a long signal transmission channel often results in an error due to reflected signals, caused by a fact that an emitted signal is reflected at the end of the channel and is received, with a time delay, by the receiving circuit of the same transmission control circuit.

Besides, certain receiving circuits tend to cause distortions in signals by an abrupt change in the signal transmission channel from a signal-free state to a signal-containing state, thus generating error signals.

Also certain signal receiving circuits terminate the signal processing by detecting a signal pattern, generally called postamble, attached at the end of received signal for indicating the end of signal.

However, if such a signal pattern is not received by some reason, the signal processing circuit continues to function and may detect a part of the signal patterns present in the subsequently received signals as the end signal pattern, thus resulting in a loss in the subsequently received signals.

It is therefore conceivable to terminate the signal processing by detecting the end of signal reception from the signal transmission channel, but such method is still defective in that a short distortion in the received signal or a short absence of a received signal may be judged as the end of signal.

SUMMARY OF THE INVENTION

In consideration of the foregoing, an object of the present invention is to provide a transmission control apparatus enabling efficient data transmission without the influence of noise.

Another object of the present invention is to prevent an erroneous operation caused by error data resulting from a distortion in the received signal, often observed at the start of signal reception.

Still another object of the present invention is to provide a transmission control apparatus capable of preventing the signal emitted therefrom from influencing the apparatus, thereby enabling stable signal transmission.

Still another object of the present invention is to provide a transmission control apparatus not easily activated by a single pulse or a similar signal, thus providing an apparatus stable against noise.

Still another object of the present invention is to enable easy detection of the absence of a signal in the signal transmission channel, thereby terminating the signal receiving state and achieving initialization for receiving the next signal.

Still another object of the present invention is to provide a transmission control apparatus capable of highly efficient signal reception even in the presence of a short signal distortion or a short absence of signals.

The foregoing and still other objects of the present invention, and the advantages thereof, will become fully apparent from the following description.

DETAILED DESCRIPTION OF THE PREFERRED EMBODIMENTS

Now the present invention will be clarified in detail by describing the preferred embodiments thereof shown in the attached drawings.

Figure 1:
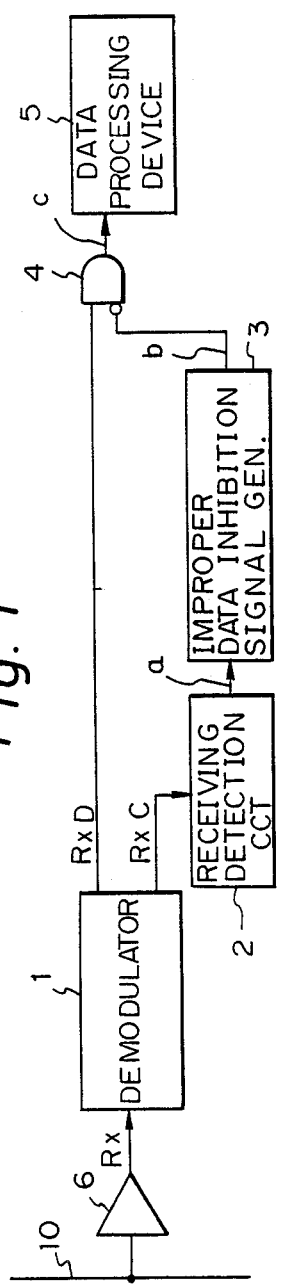
FIG. 1 is a block diagram of a first embodiment of the transmission control apparatus of the present invention.

FIG. 1 is a block diagram of a first embodiment of the transmission control apparatus of the present invention, wherein provided are a demodulating circuit 1, a reception detecting circuit 2, an inhibition signal generating circuit 3 for generating an inhibition signal for inhibiting improper signals, a gate 4 for selecting received data, a data processing device 5 such as a printer, a word processor or a computer, a receiving circuit 6, and a transmission channel 10.

Figure 2:
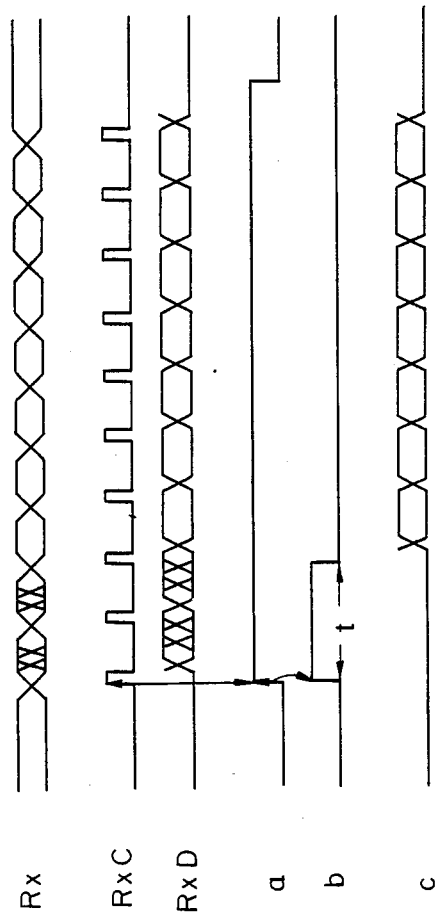
FIG. 2 is a timing chart showing the function of the apparatus shown in FIG. 1.

FIG. 2 is a timing chart showing the function of the receiving apparatus shown in FIG. 1.

Referring to FIG. 1, upon entry of a received signal Rx, modulated for example by Manchester encoding or EDI encoding from the transmission channel 10 through the receiving circuit 6, the demodulating circuit 1 demodulates the signal Rx to separate a time component signal RxC and a data component signal RxD therefrom. An eventual distortion in the received signal Rx, resulting from a change in the frequency or signal attenuation, induces errors in the demodulated time component signal RxC and data component signal RxD.

In response to the time component signal RxC from the demodulating circuit 1, the reception detecting circuit 2 detects the start of entry of the received signal into the demodulating circuit 1 and releases a reception detection signal a, thereby activating the generating circuit 3. The reception detecting circuit 2 continues to release the detection signal a while the time component signals RxC are entered with a regular interval. The generating circuit 3 is provided with a timer circuit composed of a monostable multivibrator, a counter etc. and supplies the gate 4 with an inhibition signal for inhibiting the entry of improper data during a predetermined period from the start of reception, or from the start of the detection signal a, thereby inhibiting the entry, during a predetermined period, of data component signal RxD for a predetermined period.

The generating circuit 3 is so designed as to generate the inhibition signal b for a predetermined period t sufficient for the initial distortion of the received signal to settle, after the start of signal reception. Consequently the data component signal RxD released from the demodulating circuit 1 is supplied to the data processing device 5 through the gate 4, starting from the termination of the inhibition signal b.

In general the initial portion of the received signal is composed of a particular signal pattern called the preamble, and the actual data are not lost as long as the inhibition period of the inhibition signal b is selected within the receiving period of the preamble pattern.

The elimination of improper data is essential for supplying the data processing device with correct data, since such improper data, if eventually modified to a data starting pattern, will be erroneously recognized as effective data.

The data processing device 5, composed for example of a computer or an image printer, executes a predetermined process on the data entered in this manner.

As explained in the foregoing, the improper data apt to occur in the initial period of signal reception can be eliminated by inhibiting the data component signal for a predetermined period from the start of signal reception. In this manner it is rendered possible to prevent the entry of improper data into the data processing device and the erroneous operation therein.

The modulation method including the time and data components is not limited to the foregoing examples but can be selected from other modulation methods such as MFM modulation.

As explained in the foregoing, satisfactory data fetching is rendered possible by invalidating the data in a period in which errors are often observed.

The foregoing first embodiment of the present invention allows the apparatus to prevent errornous data reception caused by a signal distortion in the initial period of reception of modulated signal. However, in a signal transmission apparatus capable of data sending onto a same signal transmission channel in addition to the aforementioned signal receiving function, the signal receiving operation may also be disturbed by a reflected signal, resulting from a signal emitted by said apparatus to the transmission channel.

In the following there will be explained, therefore, a transmission apparatus which is capable of avoiding the influence of the signal emitted by the apparatus on the receiving operation.

Figure 3:
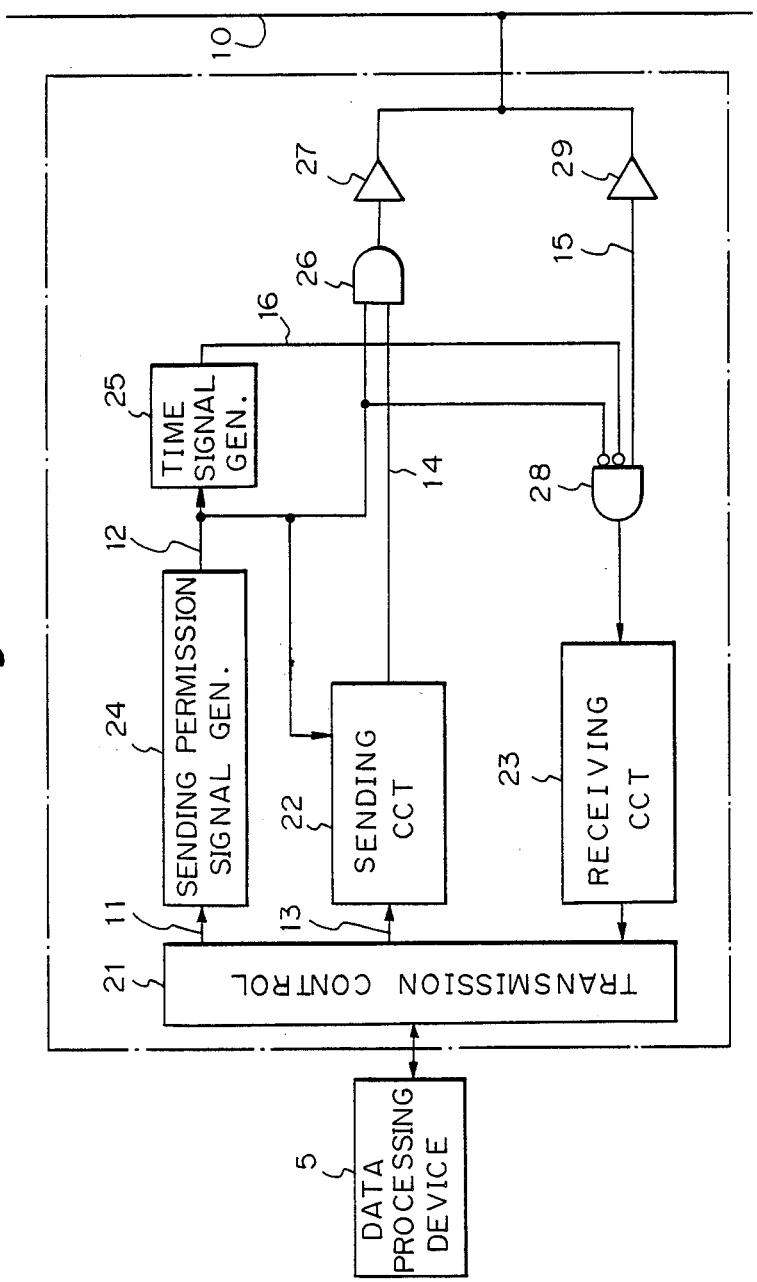
FIG. 3 is a block diagram of a second embodiment of the transmission control apparatus of the present invention.

FIG. 3 is a schematic block diagram of a second embodiment of the transmission control apparatus of the present invention, wherein provided are a transmission control circuit 21, a sending circuit 22, a receiving circuit 23, a sending permission (enable) signal generating circuit 24, a time signal generating circuit 25, a sending gate 26, a drive (amplifier) 27, a receiving gate 28, a receiver (amplifier) 29, a data processing device 5, and a transmission channel 10.

In response to a sending start signal 11 supplied from the transmission control circuit 21, the generating circuit 24 emits a sending permission signal 12 to enable the function of the sending circuit 22. The sending circuit 22 receives, from the data processing device 5 and through the transmission control circuit 21, a data signal 13 to be transmitted to another station through the transmission channel 10, converts the signal 13 into a transmission signal 14 suitable for transmission through the channel 10, for example, by compression or modulation, and releases the signal to the channel 10 through the sending gate 26 and the driver 27.

The sending gate 26 is enabled by the sending permission signal from the generating circuit 24 whereby the transmission signal 14 from the sending circuit 22 is transmitted to the driver 27.

The sending permission signal 12 is also sent to the receiving gate 28 to disable the same, thereby inhibiting the entry of a received signal 15 from the driver 29 to the receiving circuit 23. Thus the transmission signal 14 transmitted by the sending circuit 22 cannot enter the receiving circuit 23 during the data sending.

The sending permission signal 12 is furthermore supplied to a generating circuit 25 provided with a timer circuit composed for example of a monostable multivibrator, a counter etc., and generating circuit 25 generates a time signal 16 of a predetermined duration, starting from the end of the sending permission signal 12.

Time signal 16 is supplied to the receiving gate 28 to inhibit the entry of the received signal 15 into the receiving circuit 23, in the same manner as the inhibition by the sending permission signal 12 and in continuation thereto. This inhibition prevents the reception of the reflective wave, caused by the signal emitted by the same apparatus and appearing after the emission, thereby avoiding the influence by such reflected signal.

As explained in the foregoing, undesirable effects and erroneous operations caused by the reflected signal on the receiving circuit in a bus-utilizing system can be prevented by inhibiting the entry of the received signal into the receiving circuit for a predetermined period, by means of an inhibition signal which is generated in continuation to the sending permission signal for enabling the signal sending.

In this manner the signal entry into the receiving circuit is inhibited during the signal sending and also during a predetermined period thereafter, thereby avoiding the inconveniences caused by the signal emitted by the same apparatus and enabling satisfactory signal transmission.

Furthermore, the foregoing first and second embodiments may be combined to achieve efficient prevention of erroneous noise reception in signal sending and receiving.

The above-explained first or second embodiment prevents the reception of noise signals at the start of signal reception or at the end of signal sending, but is unable to cope with a noise signal received at another time.

Also simple inhibition of signal entry for preventing the noise signal may result in undesirable invalidation of the effective signal. For example a short pause in a series of signals may cause invalidation of the effective signal after the pause.

Thus there will now be explained another embodiment which enables satisfactory elimination of noise signals without such inconveniences and further enables efficient transmission control.

Figure 4:
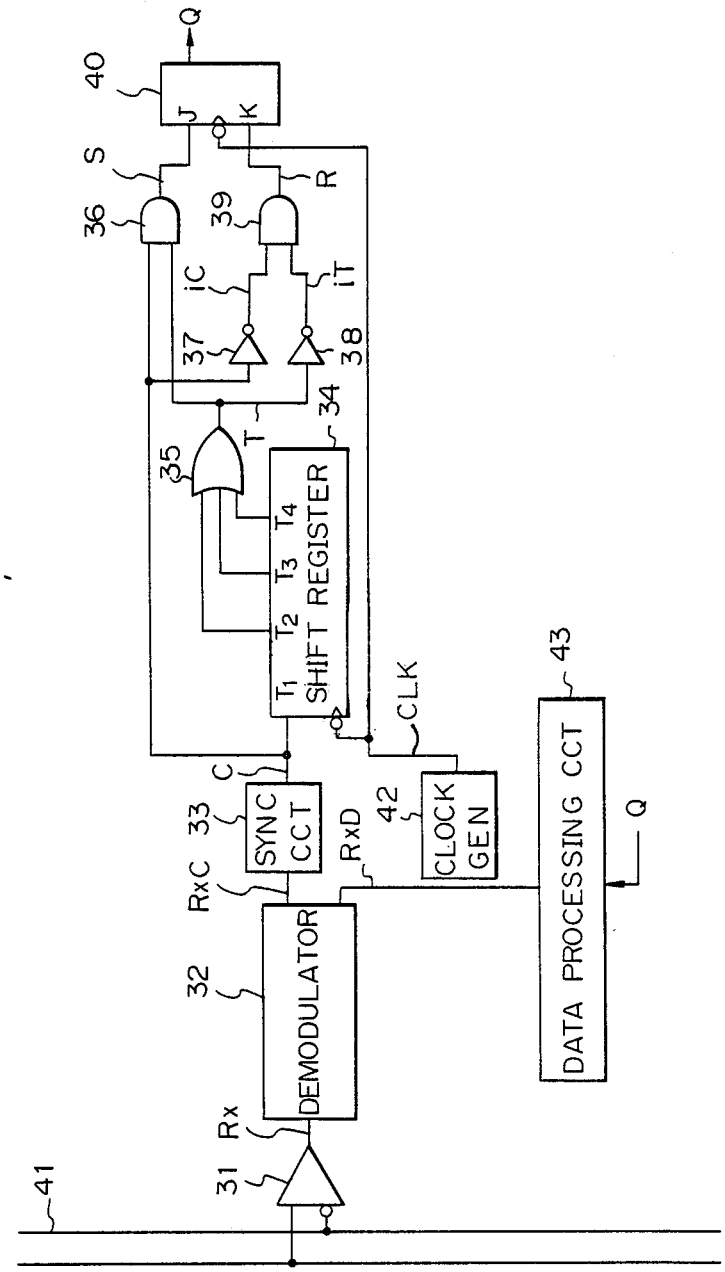
FIG. 4 is a block diagram of a third embodiment of the transmission control apparatus of the present invention.

FIG. 4 is a block diagram of a third embodiment of the transmission control apparatus of the present invention, wherein provided are a receiving circuit 31, a demodulating circuit 32, a synchronization circuit 33, a shift register 34, an OR gate 35, AND gates 36, 39, inverters 37, 38, a JK-flip-flop 40, a signal transmission channel 41, a clock signal generator 42, and a data processing circuit 43.

The above-mentioned components are connected as shown in FIG. 4 to constitute a signal detecting circuit.

Figure 5:
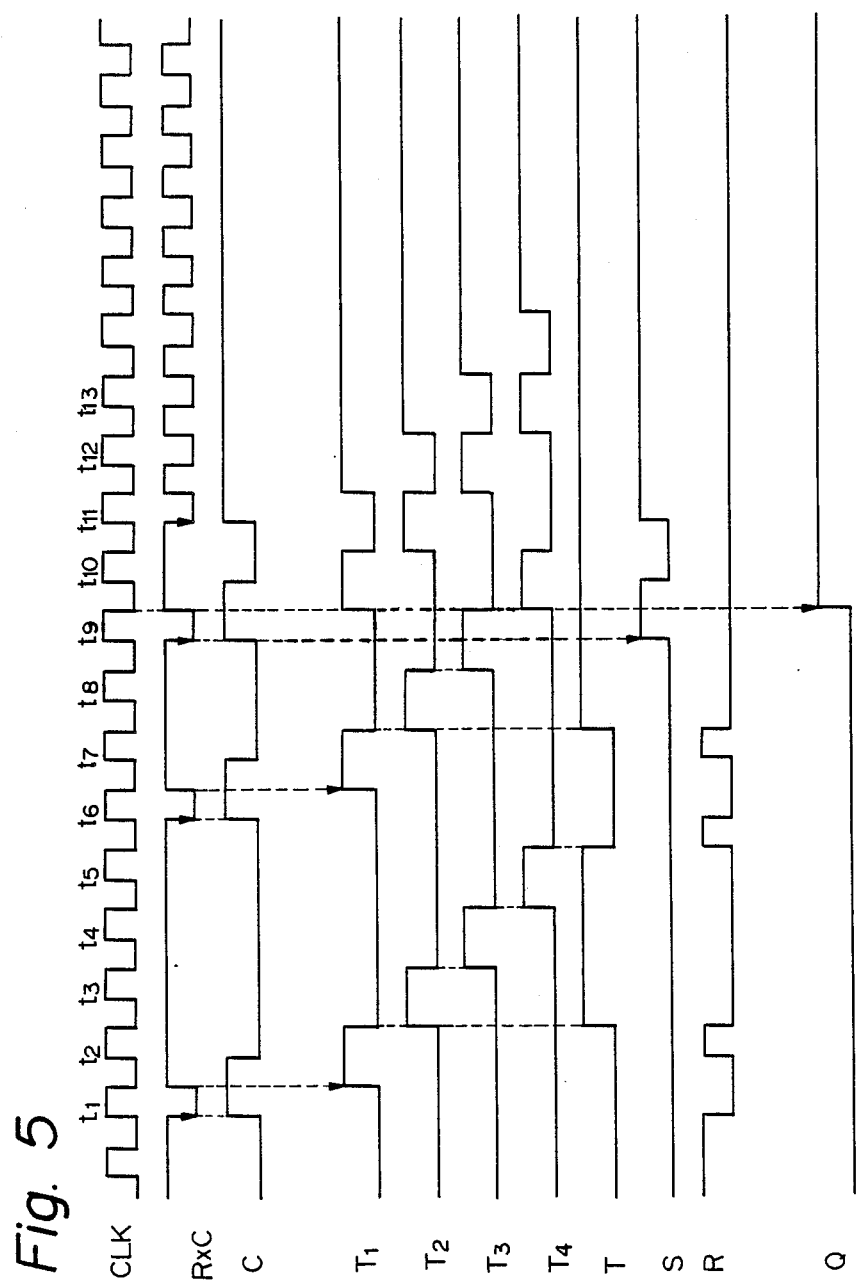
FIGS. 5 and 6 are timing charts showing the function of the apparatus shown in FIG. 4.
Figure 6:
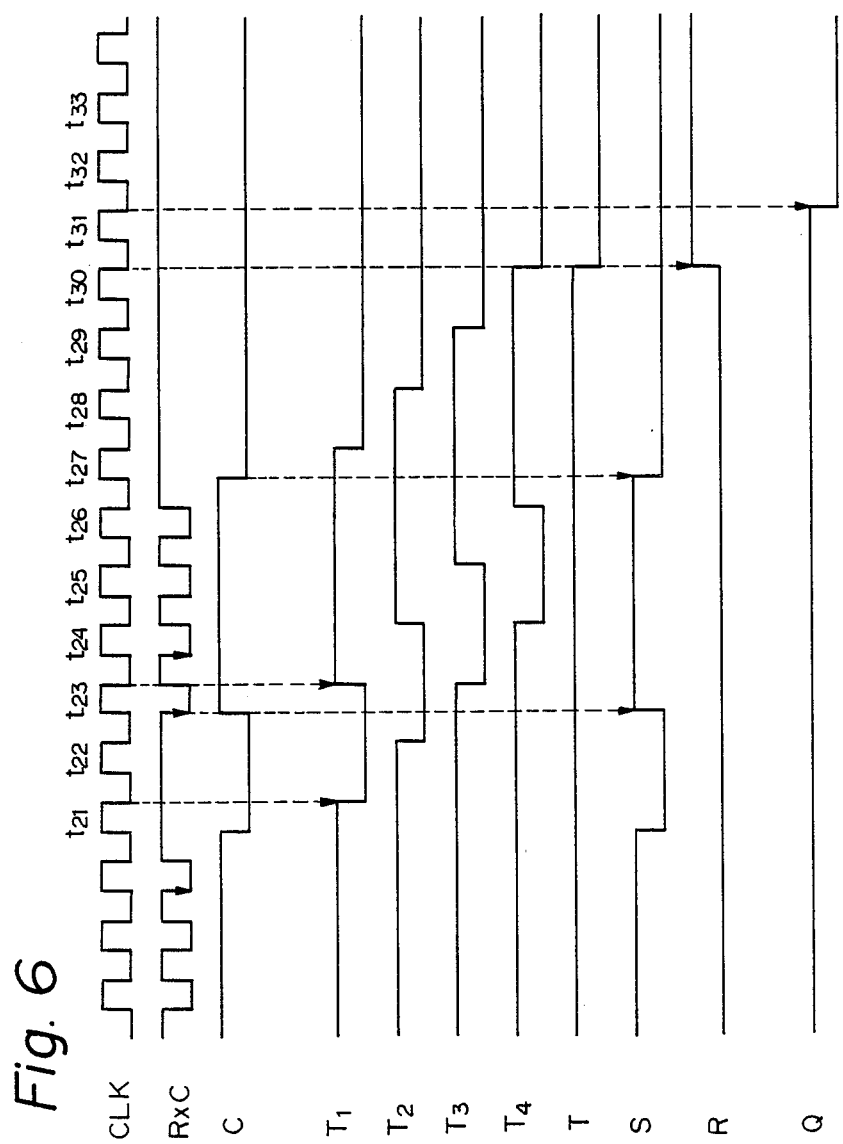

FIGS. 5 and 6 are timing chart showing the function of said signal detecting circuit shown in FIG. 4.

In the following there will be explained the function of the circuit shown in FIG. 4, with reference to FIGS. 5 and 6.

The clock signal generator 42 generates a clock signal CLK of a regular interval utilized for controlling the function of the signal detecting circuit, and the interval is equal to the minimum unit time of the signal to be received.

The signal from the transmission channel 41 is received by the bus-connected receiving circuit 31, which releases a received signal Rx, modulated with a time component and a data component, for example by Manchester encoding. Signal Rx is supplied to the demodulating circuit 32 which separates a time component signal RxC and a data component signal RxD contained in the signal Rx.

The data component signal RxD obtained from the demodulating circuit 32 is subjected to a predetermined process in the data processing circuit 43 composed for example of a computer.

On the other hand, the time component signal RxC obtained from the demodulating circuit 32 is formed, in the synchronization circuit 33, as a synchronization signal C of a duration equal to a cycle period of the clock signal CLK. The synchronization signal C is equivalent to the time component signal RxC as it is generated from the time component signal.

The synchronization signal C is supplied to the shift register 34 and is fetched thereby in synchronization with the downshift of the clock signal CLK. In the present embodiment the shift register 34 has a capacity of 4 bits, and releases output signals T1-T4, which are obtained by delaying the synchronization signal C in synchronization with the downshift of the clock signal CLK.

Among the output signals of the shift registers 34, T2-T4 are supplied to the OR gate 35 to obtain a time signal T, of which duration (4-bit time) is called a specified time. The specified time is determined by the number of bits of the shift register 34 and the selections of bits thereof, and can be easily changed by varying the number of bits of the shift register and adding or deleting the output bits supplied to the OR gate 35.

The time signal T is supplied to an input terminal of the AND gate 36, of which the other input terminal receives the synchronization signal C from the synchronization circuit 33. It is to be noted again that the synchronization signal C, which is generated from the time component signal RxC, is equivalent thereto.

When the synchronization signal C assumes a state "1" while the time signal T is in a state "1", the AND gate 36 releases a reception detection signal S="1".

On the other hand, if the synchronization signal C remains in a state "0" while the time signal T is in a state "1", the reception detection signal S remains in a state "0".

The former corresponds to a state in which a next synchronization signal C is detected within the specified time after the detection of a first synchronization signal C, indicating that the signal received by the receiving circuit 31 is a continuous signal.

On the other hand the latter corresponds to a state in which a next synchronization signal C is not received within the specified time after the detection of a first synchronization signal C, indicating that the received signal is a single signal.

In the former case of continuous signal, the AND gate 36 releases the reception detection signal S="1" which sets the flip-flop 40, reset prior to the start of reception, in synchronization with the downshift of the clock signal CLK. The setting of the flip-flop 40 sets the signal detecting circuit to a signal-receiving state, whereby a signal-receiving signal Q is released, while the data processing circuit 43 processes the received signal as an effective signal.

On the other hand, in the latter case of single signal, the reception detection signal S remains "0" and does not set the flip-flop 40, which therefore remains at the reset state and does not release the signal-receiving signal Q.

In this manner a single signal received by the receiving circuit 31 does not activate the signal detecting circuit. Consequently the data processing circuit 43 is not activated and does not execute unnecessary operation, for example for noise.

In FIG. 5, the time signal T is "1" in a period t3-t5 but the synchronization signal C remains at "0" so that the reception detection signal S and the signal-receiving signal Q are both "0".

Also during the duration of the time signal T starting from t8 in response to the time component signal RxC received at t6, a next time component signal RxC is received at t9. This is reflected in the synchronization signal released in t9 to t10, and the reception detection signal S="1" is released. Thus, the flip-flop 40 is set simultaneously with the down-shift of the clock signal CLK to release the signal-receiving signal Q.

After t9, the reception detection signal S remains at "1" during the reception of the continuous signal. The flip-flop 40, being JK type, remains in the set state once it is set.

As explained in the foregoing, the received signal can be easily identified as a normal signal or a single pulse caused for example by noise, by detecting whether a time component signal, extracted from the signal received from the transmission channel, arrives at a time interval within a particular specified time.

Also the signal detecting circuit prevents erroneous operation caused for example by noise, by disregarding a detected single pulse as ineffective.

The AND gate 39 detects the absence of a signal to release a signalless state signal R, and receives, at an input terminal thereof, the time signal T through the inverter 38, and at the other input terminal, the synchronization signal C through the inverter 37.

The AND gate 39 constitutes a signalless state detecting circuit for inhibiting the output of a reset signal during the specified time regardless of the presence of the time component signal RxC, and releasing the reset signal for the flip-flop 40 in the absence of the time component signal RxC when said specified time expires.

FIG. 6 shows a case where the time component signal RxC is lost for 2 bit time in t21 to t22.

Because of the loss of the time component signal RxC for 2 bit time, the synchronization signal C is also shifted to "0" for a 2-bit period t21-t23. This state is reflected in the shift register 34 whereby the output signals T1-T4 are delayed.

However the synchronization signal C recovers at t23, and the output signals T1-T4 of the shift register 34 also recover in succession.

The time signal T, being formed from the outputs T2-T4 of the shift register 34, remains at the state "1" if the loss of the time component signal RxC is within the predetermined 4-bit period.

Consequently an inverted signal iT of the time signal T constituting an input signal to the AND gate 39 remains at "0", so that the signalless state signal is not released. Thus the data processing circuit 43 continues processing efficiently despite of a shift interruption.

As explained in the foregoing, the detecting state of the signal detecting circuit is retained even in the presence of a distortion or a loss of the time component signal, extracted from the signal received from the transmission channel, within a specified time, thereby preventing the data inhibition often encountered at the start of signal reception and enabling more efficient signal processing.

Also FIG. 6 shows, after t27, a state in which the time component signal RxC is not released over a prolonged period.

The absence of the time component signal RxC at t27 shift the synchronization signal C to "0", and this is reflected in the shift register 34 to turn the outputs T1-T4 to "0" in succession, whereby the time signal T is shifted to "0" after a 4-bit time from t27. Since the inverted signal iT of said time signal T is supplied to the AND gate 39, it releases the signalless state signal R when said inverted signal iT assumes the state "1" together with the other input inverted signal iC, thereby resetting the flip-flop 40 in synchronization with the downshift of the clock signal CLK at t31.

The detection of signalless state indicates the end of signal reception from the transmission channel, and the signalless state signal R terminates the function of the signal detecting circuit and initializes the same. Consequently, in case of a prolonged interruption, the processing operation of the data processing circuit 43 can be promptly interrupted, and unnecessary processing operation can be avoided.

As explained in the foregoing, a signalless state can be easily identified by detecting the absence of a succeeding time component signal without the specified time after the preceding time component signal extracted from the signal received from the transmission channel.

Also the detection signal of the signalless state resets the signal detecting circuit in signal receiving state, thereby initializing immediately the signal detecting circuit for the signal to be received next.

Though the foregoing embodiment has been explained by an example of receiving a Manchester encoded signal, it is applicable also to the reception of signals modulated by other methods such as DMI encoding.

As explained above, a normally received signal can be easily identified by detecting that a time component signal extracted from the signal received from the transmission channel arrives at a time interval smaller than a specified time. Also a single pulse caused for example by a noise can be easily identified in case the time component signal does not arrive within said specified time.

Also a single pulse this identified is disregarded as ineffective signal, so that an erroneous operation can be avoided in the signal receiving apparatus.

Furthermore the signal receiving state is maintained even in case the signal received from the transmission channel is lost or distorted within said specified time, thereby preventing the data inhibition often encountered at the initial period of signal reception and thus enabling more efficient signal processing.

Furthermore a signalless state can be easily identified by a fact that a time component signal extracted from the signal received from the transmission channel cannot be detected within a specified time.

Furthermore, the detection signal of the signalless state is used for initializing the signal receiving apparatus, thus immediately preparing the apparatus for the signal to be received next.

The above-explained third embodiment may be combined with the first and/or second embodiment to prevent erroneous operation caused by a perturbation on the received signal, caused by noises or signal distortions on the transmission channel, and to achieve more efficient signal transmission control.

Though the present invention has been explained by certain embodiments thereof, it is not limited to such embodiments but is subjected to various modifications or applications within the scope and spirit of the appended claims.

What is claimed is:

1. A transmission control apparatus comprising:
receiving means for receiving data, said receiving means further comprising demodulating means for receiving data modulated by a modulating method containing a time factor and a data factor, and demodulating the modulated data into a time component signal and a data component signal;
detecting means for detecting the start of data reception by said receiving means;
generating means for generating an inhibition signal for a predetermined period from the detection of the start of data reception by said detecting means; and
invalidating means for invalidating, in accordance with the inhibition signal, the data received by said receiving means for the predetermined period from the start of data reception by said detecting means.

2. A transmission control apparatus comprising:
receiving means for receiving data modulated by a modulating method involving a time factor and a data factor;

demodulating means for demodulating said modulated data into a time component signal and a data component signal;

detecting means for detecting the start of data reception by said receiving means in response to the time component signal from said demodulating means;

generating means for generating an inhibition signal for a predetermined period from the detection of the start of data reception by said detecting means; and invalidating means for invalidating, in accordance with the inhibition signal, the data received by said receiving means for the predetermined period from the start of data reception by said detecting means.

3. A transmission control apparatus according to claim 2, wherein said invalidating means comprises:

inhibiting means for inhibiting, in response to said inhibition signal, the transmission of data received by said receiving means to a processing device.

4. A transmission control apparatus comprising:

sending means for sending data;

receiving means for receiving data;

first generating means for generating a first signal during data sending by said sending means;

second generating means for generating a second signal for a predetermined period from the termination of data sending by said sending means; and inhibiting means for inhibiting, in accordance with said first and second signals, the data reception by said receiving means, during data sending by said sending means and during a predetermined period after the termination of data sending by said sending means.

5. A transmission control apparatus according to claim 4, wherein said sending means is operable to send data in accordance with said first signal.

6. A transmission control apparatus according to claim 4, wherein said sending is adapted to send data to a signal transmission channel, and said receiving means is adapted to receive data from the same signal transmission channel.

7. A transmission control apparatus comprising:

receiving means for receiving data;

detecting means for detecting the entry of data into said receiving means;

generating means for generating a time signal for a predetermined period from the detection of the entry of data by said detecting means;

discriminating means for discriminating whether said detecting means detects the entry of succeeding data during the time when the time signal is generated by said generating means; and invalidating means for invalidating data received by said receiving means in the event that said discriminating means discriminates that said detecting means does not detect the entry of succeeding data during a period of time when the time signal is generated by said generating means.

8. A transmission control apparatus according to claim 7, wherein said invalidating means is operable to not invalid data received by said receiving means in case said discriminating means discriminates that said detecting means detects the entry of succeeding data during the time when the time signal is generated by said generating means.

9. A transmission control apparatus according to claim 7, wherein said receiving means comprises demodulating means for receiving data modulated by a modulating method including a time factor and a data factor, and demodulating said modulated data into a time component signal and a data component signal.

10. A transmission control apparatus according to claim 9, wherein said detecting means is adapted to detect the entry of data in response to the time component signal from said demodulating means.

11. A transmission control apparatus comprising:

receiving means for receiving data;

detecting means for detecting the entry of data into said receiving means;

generating means for generating a time signal for a predetermined period from the termination of the detection of the entry of data by said detection means;

discriminating means for discriminating whether said detecting means detects the entry of succeeding data during the time when the time signal is generated by said generating means; and resetting means for resetting the data receiving state of said receiving means in the event that said discriminating means discriminates that said detecting means does not detect the entry of succeeding data during the period of time when the time signal is generated by said generating means.

12. A transmission control apparatus according to claim 11, wherein said resetting means is operable to not reset the data receiving state of said receiving means in the event that said discriminating means discriminates that said detecting means detects the entry of succeeding data during the time when the time signal is generated by said generating means.

13. A transmission control apparatus according to claim 11, wherein said receiving means comprises demodulating means for receiving data modulated by a modulating method involving a time factor and a data factor and demodulating said modulated data into a time component signal and a data component signal.

14. A transmission control apparatus according to claim 13, wherein said detecting means is adapted to detect the entry of data, in response to the time component signal from said demodulating means.

15. A transmission control apparatus according to claim 2, wherein said invalidating means has gating means for gating the data component signal in accordance with the inhibition signal.

16. A transmission control apparatus according to claim 4, wherein said second generating means generates said second signal after generation of said first signal.

17. A transmission control apparatus according to claim 4, wherein said inhibiting means inhibits the transmission of data received by said receiving means to processing means in accordance with at least one of said first and second signals.

* * * * *

UNITED STATES PATENT AND TRADEMARK OFFICE
CERTIFICATE OF CORRECTION

PATENT NO. : 4,839,908
DATED : June 13, 1989
INVENTOR(S) : HARUYOSHI TAKAYAMA

It is certified that error appears in the above-identified patent and that said Letters Patent is hereby corrected as shown below:

COLUMN 4

Line 11, "drive (amplifier) 27," should read --drive (amplifier) 27--.

COLUMN 7

Line 33, "of" should be deleted.

COLUMN 9

Line 38, "said sending" should read --said sending means--.
Line 61, "not invalid" should read --not invalidate--.

Signed and Sealed this

Twenty-fourth Day of April, 1990

Attest:

HARRY F. MANBECK, JR.

Attesting Officer

Commissioner of Patents and Trademarks